United States Patent
Galpin et al.

(10) Patent No.: US 9,852,283 B2
(45) Date of Patent: *Dec. 26, 2017

(54) CONFIRMING THE IDENTITY OF INTEGRATOR APPLICATIONS

(71) Applicant: GOOGLE INC., Mountain View, CA (US)

(72) Inventors: Michael David Galpin, San Jose, CA (US); Jon Christian Boekenoogen, Sunnyvale, CA (US); Scott Roy Atwood, Campbell, CA (US); Jeffrey William Hamilton, Austin, TX (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/348,944

(22) Filed: Nov. 10, 2016

(65) Prior Publication Data

US 2017/0061118 A1    Mar. 2, 2017

Related U.S. Application Data

(63) Continuation of application No. 14/032,193, filed on Sep. 19, 2013, now Pat. No. 9,531,718.

(51) Int. Cl.
*H04L 29/06* (2006.01)
*G06F 21/44* (2013.01)
(Continued)

(52) U.S. Cl.
CPC ......... *G06F 21/44* (2013.01); *G06Q 30/0635* (2013.01); *H04L 9/3213* (2013.01);
(Continued)

(58) Field of Classification Search
CPC ................ H04L 63/10; G06F 21/44
See application file for complete search history.

(56) References Cited

U.S. PATENT DOCUMENTS 6,760,841 B1    7/2004 Fernandez
9,531,718 B2*  12/2016 Galpin .................. H04L 63/10
(Continued)

FOREIGN PATENT DOCUMENTS

WO        01/99005 A1    12/2001
WO    2015/042427 A1     3/2015

OTHER PUBLICATIONS

Moon, "Korean Office Action issued in Korean Application No. 10-2016-7010087", dated Feb. 27, 2017, 4 pages of English Translation and 4 pages of Korean Office Action.
(Continued)

*Primary Examiner* — David Pearson
(74) *Attorney, Agent, or Firm* — Johnson, Marcou & Isaacs, LLC

(57) ABSTRACT

An application service system receives, from a merchant service system, an application program code comprising identifying information. The identifying information is extracted and the application is distributed for operation on a user device. A user interacts with the application, creating an access request that is transmitted to the application service system along with the extracted identifying information. The application service system transmits an access token to the user device comprising the received identifying information. The user device transmits the access token with a service request to the application service system. The application service system compares the identifying information from the access token to the identifying information extracted from the application program code received from the merchant services system. If the identifying information matches, the service request is processed. If the identifying information does not match, the service request is denied and an error message is transmitted to the user device.

19 Claims, 6 Drawing Sheets

(51) Int. Cl.
  *H04L 29/08* (2006.01)
  *G06Q 30/06* (2012.01)
  *H04L 9/32* (2006.01)

(52) U.S. Cl.
  CPC ...... *H04L 63/0807* (2013.01); *H04L 63/0876* (2013.01); *H04L 63/10* (2013.01); *H04L 67/32* (2013.01); *H04L 67/34* (2013.01)

(56) References Cited

U.S. PATENT DOCUMENTS

| | | |
|---|---|---|
| 2009/0271847 A1 | 10/2009 | Karjala et al. |
| 2012/0144202 A1 | 6/2012 | Counterman |
| 2012/0173431 A1 | 7/2012 | Ritchie et al. |
| 2012/0191613 A1 | 7/2012 | Forbes et al. |
| 2012/0203670 A1 | 8/2012 | Piersol |
| 2012/0209630 A1 | 8/2012 | Ihm et al. |
| 2012/0254042 A1 | 10/2012 | Ludemann |
| 2013/0144755 A1 | 6/2013 | Mowatt et al. |
| 2013/0219480 A1 | 8/2013 | Bud |
| 2014/0082715 A1 | 3/2014 | Grajek et al. |
| 2014/0150096 A1 | 5/2014 | Moon et al. |
| 2014/0337230 A1 | 11/2014 | Bacastow |
| 2015/0082407 A1 | 3/2015 | Galpin et al. |

OTHER PUBLICATIONS

Ahn, "International Search Report and Written Opinion issued in International Application No. PCT/US2014/056596", dated Dec. 12, 2014, 14 pages.

Moon, "International Preliminary Report on Patentability issued in International Application No. PCT/US2014/056596", dated Mar. 31, 2016, 11 pages.

Pearson, "U.S. Office Action issued in copending U.S. Appl. No. 14/032,193, filed Sep. 19, 2013", dated Apr. 1, 2016, 19 pages.

Padilla, "Extended European Search Report issued in European Application No. 14846507.3", dated Mar. 30, 2017, 8 pages.

* cited by examiner

CONFIRMING THE IDENTITY OF INTEGRATOR APPLICATIONS

CROSS REFERENCE TO RELATED APPLICATIONS

This application is a continuation of and claims priority to U.S. patent application Ser. No. 14/032,193 filed Sep. 19, 2013, and entitled "Confirming the Identity of Integrator Applications." The complete disclosure of the above-identified priority application is hereby fully incorporated herein by reference.

TECHNICAL FIELD

The present disclosure relates generally to an application verification system, and more particularly to methods and systems that provide verification of an identity of an application making a service request.

BACKGROUND

Merchants and application developers create applications that allow users to initiate service requests that comprise a request for information from a third party system or a request to process a financial transaction by the third party system. When these requests are processed by the third party system, the third party system must effectively verify the identity of the application conveying the request, so that the user and the merchant services are protected from fraud, identity theft, and other malicious behavior.

Traditionally, systems have verified the identity of the application conveying the request through the use of web tokens. The application can present a web token and make a request for an access token from the third party system. This authentication process requires the use of shared secrets, which gives each party access to the same cryptographic key. Under this method, in order to prove its identity to the third party system, the application must first identify itself to the merchant service's servers to be allowed access to the shared secret. This circular identification process may be burdensome to merchant services.

SUMMARY

In certain example aspects described herein, a method for verifying the identity of an application making a service request comprises receiving, from a merchant service system, application program code comprising identifying information. The identifying information is extracted and saved by an application service system and the application is distributed for operation on a user device. A user initiates a service request using the application on the user device. In an example embodiment, the service request comprises a request to utilize a service provided by the application service system. The user device extracts the identifying information from the application program code on the user device and transmits an access request to the application service system. In an example embodiment, the access request comprises the identifying information extracted from the application program code on the user device. In response to receiving the access request, the application service system produces an access token comprising the identifying information extracted from the application program code on the user device and transmits the access token to the user device. In response to receiving the access token, the user device transmits the service request to the application service system. In an example embodiment, the service request comprises the access token. In response to receiving the service request, the application service system verifies the identity of the application making the service request by comparing the identifying information in the access token associated with the service request with the identifying information saved by the application service system. If the identifying information matches, the service request is processed by the application service system. However, if the identifying information does not match, the service request is denied and an error message is transmitted to the user device.

These and other aspects, objects, features, and advantages of the exemplary embodiments will become apparent to those having ordinary skill in the art upon consideration of the following detailed description of illustrated exemplary embodiments.

DETAILED DESCRIPTION OF THE EXAMPLE EMBODIMENTS

Overview

Figure 1:
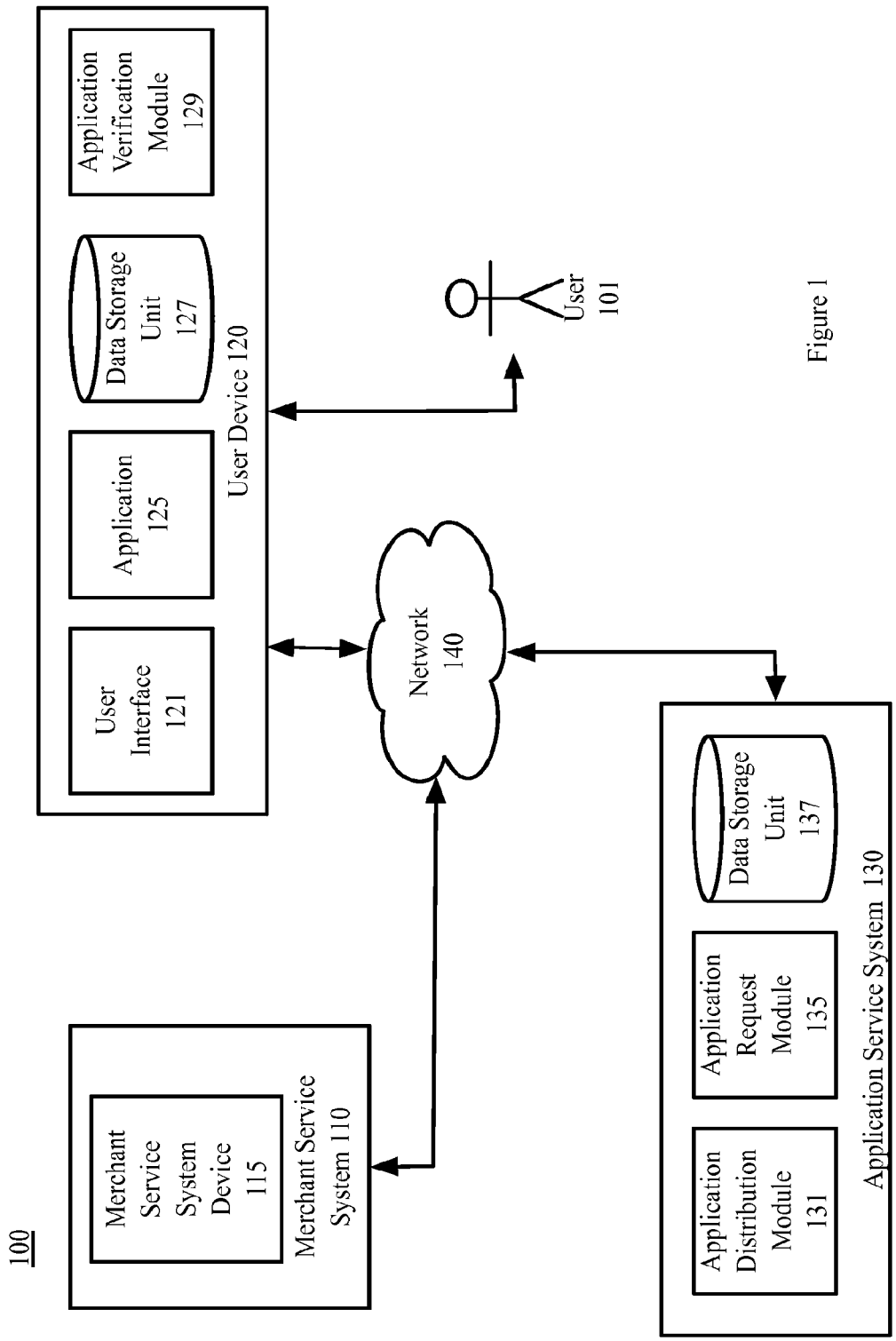
FIG. 1 is a block diagram depicting an application verification system, in accordance with certain example embodiments.

The example embodiments described herein provide computer-implemented techniques for verifying the identity of applications making requests to access services. In an example embodiment, a user accesses a service on a user device (for example, an application) and initiates a service request that utilize a service provided by the application service system. Before facilitating the service request, the application service system verifies the identity of the application making the service request.

For example, a user accesses an application to buy tickets from an airline. The user submits a request to buy a ticket from the airline using the application. The application makes a service request to the application service system to facilitate one or more aspects of the transaction, such as processing the payment information to purchase the ticket. Prior to processing the payment, the application service system verifies the identity of the application from which the service request originated.

In another example, a user accesses an application and orders a product from Merchant A, which Merchant A will deliver and install in person at the user's residence. Upon verification of the identity of Merchant A's application, the application service system's mapping service provides Merchant A with a route of delivery to the user's location and an estimated travel time.

In yet another example, a user initiates a transaction using a Merchant B's shopping application. Upon verification of the identity of Merchant B's application, the application service system provides access to the user's digital wallet to obtain payment information or to apply offers.

A merchant service system creates an application program code for the application. In an example embodiment, a merchant service system creates and operates the merchant service system device to create an application that allows the user to initiate a process or service directed at the merchant service system and facilitated by the application service system. For example, a hotel chain creates an application that allows users to reserve rooms from the hotel chain directly using the user device, and outsources the financial transaction aspect of the room reservation to the application service system. In another example embodiment, the merchant service system creates an application that enables the user to initiate a process or service facilitated by the application service system but directed at some other party. For example, a third party develops an application on behalf of (or under the direction of) a charitable organization that enables the user to donate money to the organization using the application on the user device.

The application program code, created via the merchant service system, comprises identifying information that enables the application service system to verify the identity of the application from which the service request originated. In an example embodiment, the identifying information comprises information required by the application service system as a prerequisite to distributing the application. In another example embodiment, the identifying information may comprise any suitable information from the application program code that the application service system later wants to consider as identifying information. The merchant service system transmits the application, which comprises the identifying information, to the application service system where the application is stored.

The application service system extracts and stores the identifying information from the application program code. In an example embodiment, the application service system has a prior developed process for automatically sifting through the program code and finding the identifying information. For example, the application service system may require a standardized location in the program code in which the merchant service system must insert identifying information. In another example embodiment, the application service system runs a search algorithm or computer process to find and extract the identifying information.

The application service system distributes the application through selected distribution channels. The developer system may select the channels through which it wants to distribute the application. In an example embodiment, the application service system makes the application available on a website, an application store (app store), an online marketplace, or any location that allows the user to select and download the application. In another example embodiment, the application is transmitted by electronic mail, text messaging, or another suitable system configured to transmit the application to the user device or otherwise make the application available for download on the user device.

The user reviews and selects the application. In an example embodiment, the user reviews, selects (on the website, marketplace, app store, or other suitable location), and downloads or otherwise authorizes running the application on the user device. The application is saved on the user device. The user opens the application on the user device and initiates a service request using the application. In an example embodiment, the service request can be in the form of an authorization of payment, a request for specific information, or any other suitable service request made available by the application. In an example embodiment, in order to fulfill the service request, the application requires facilitating, processing, or servicing by the application service system.

The user device transmits an access request to the application service system. In an example embodiment, the access request comprises the identifying information from the application program code on the user device. In an example embodiment, an application verification module, or other suitable means on the user device, extracts the identifying information from the application program code on the user device. In an example embodiment, the user device identifies a standardized location in the application program code and extracts the identifying information. In another example embodiment, an algorithm or computer program is executed that is able to identify the information on the user device.

The user device transmits the extracted identifying information to the application service system in the access request. In response to receiving the access request from the user device, the application service system produces an access token. In an example embodiment, the access token comprises the identifying information received from the user device.

In response to receiving the access token, the user device transmits the service request to the application service system. In an example embodiment, the service request comprises the access token received from the application service system. In this embodiment, the access token comprises the identifying information extracted by the user device and transmitted to the application service system in the access request.

The application service system receives the service request and verifies the identity of the application making the request. In an example embodiment, the application service system compares the identifying information received in the service request (for example, the identifying information extracted from the user device) to the identifying information stored by application service system (for example, the identifying information extracted from the application program code received from the merchant service system). If the identifying information matches, the application service system allows the service request to be processed. If the identifying information does not match, the application service system denies the service request and transmits an error message to the user device. In an example embodiment, the error message is displayed as a pop up window, an electronic message, or other suitable notification on the user device.

The inventive functionality of the invention will be explained in more detail in the following description, read in conjunction with the figures illustrating the program flow.

Example System Architecture

Turning now to the drawings, in which like numerals indicate like (but not necessarily identical) elements throughout the figures, example embodiments are described in detail.

FIG. 1 is a block diagram depicting an application identify verification system, in accordance with certain example embodiments. As depicted in FIG. 1, the exemplary operating environment 100 comprises a merchant service system 110, a user device 120, and an application service system 130 that are configured to communicate with one another via one or more networks 140. In another example embodiment, two or more of these systems (including systems 110, 120, and 130) are integrated into the same system. In some embodiments, a user 101 associated with a device must install an application and/or make a feature selection to obtain the benefits of the techniques described herein.

Each network 140 includes a wired or wireless telecommunication means by which network system (including systems 110, 120 and 130) can communicate and exchange data. For example, each network 140 can be implemented as, or may be a part of, a storage area network (SAN), personal area network (PAN), a metropolitan area network (MAN), a local area network (LAN), a wide area network (WAN), a wireless local area network (WLAN), a virtual private network (VPN), an intranet, an Internet, a mobile telephone network, a card network, Bluetooth, near field communication network (NFC), any form of standardized radio frequency, or any combination thereof, or any other appropriate architecture or system that facilitates the communication of signals, data, and/or messages (generally referred to as data). Throughout this specification, it should be understood that the terms "data" and "information" are used interchangeably herein to refer to text, images, audio, video, or any other form of information that can exist in a computer-based environment.

Each network system (including systems 110, 120 and 130) includes a device having a communication module capable of transmitting and receiving data over the network 140. For example, each network system (including systems 110, 120 and 130) can comprise a server, personal computer, mobile device (for example, notebook computer, tablet computer, netbook computer, personal digital assistant (PDA), video game device, GPS locator device, cellular telephone, Smartphone, or other mobile device), a television with one or more processors embedded therein and/or coupled thereto, or other appropriate technology that includes or is coupled to a web browser or other application for communicating via the network 140. In the example embodiment depicted in FIG. 1, the network systems (including systems 110, 120 and 130) are operated by a merchant or program code developer, a user 101, and an application service system operator, respectively.

The merchant service system 110 comprises an merchant service system device 115, which creates an application program code compatible with the user device 120 and that conforms to any required specifications given by the application service system 130 as a prerequisite to distribution. In an example embodiment, the merchant service system 110 creates the application program code itself via the merchant service system device 115. In another example embodiment, the merchant service system 110 arranges for another entity to create the application program code. The merchant service system device 115 can transmit the application program code to the application service system 130 via the network 140.

In an example embodiment, the merchant service system 110 communicates the application program code to the application service system 130. An example application service system 130 comprises an application distribution module 131, an application request module 135, and a data storage unit 137. In an example embodiment, the application program code received from the merchant service system 110 comprises computer-readable instructions for an application 125 that will operate on the user device 120. The application distribution module 131 distributes the application 125 for use on the user device 120 through one or more distribution channels. In an example embodiment, the application distribution module 131 distributes the application 125 by placing it on a website, an application store (for example, an "app" store), an online marketplace, or any location that allows the user 101 to select and download the application 125. In another example embodiment, the application 125 is transmitted by electronic mail, text messaging, or another suitable system configured to transmit the application to the user device 120 or otherwise make the application 125 available for download on the user device 120.

In an example embodiment, the application distribution module 131 extracts identifying information from the application program code received from the merchant service system 110, and saves the extracted information in the data storage unit 137. In another example embodiment, the application distribution module 131 transmits the entire application program code to be saved in the data storage unit 137.

An example application request module 135 is configured to respond to access requests and service requests made by the application 125 on the user device 120. As part of the response to an access request, the application request module 135 produces an access token comprising identifying information received from the application service system 130. In response to a service request, the application request module 135 verifies the identity of the application 125 making the service request. In an example embodiment, the application request module 135 verifies the identity of the application making the service request by comparing the identifying information comprised in the access token received from the user device to the identifying information extracted by the application distribution module 131 and saved on the data storage unit 137. If the verification is satisfactory, the application request module 135 allows the service request to be processed. However, if the verification response is not satisfactory, the application request module 135 sends an error message to the user device 120 and the service request is denied.

An example data storage unit 137 enables storage of the application program code and identifying information for access by the application request module 135. In an example embodiment, the data storage unit 137 can include any local or remote data storage structure accessible to the application service system 130 suitable for storing information. In an example embodiment, the data storage unit 137 stores encrypted information, such as HTML5 local storage.

In an example embodiment, the application service system 130 receives the service request from the user device 120. In an example embodiment, the user device 120 may be a personal computer, mobile device (for example, notebook, computer, tablet computer, netbook computer, personal digital assistant (PDA), video game device, GPS locator device, cellular telephone, Smartphone or other mobile device), television, or other appropriate technology that includes or is coupled to a web server, or other suitable application for interacting with web page files. The user 101 can use the user device 120 to view, register, download, upload, or otherwise access the application distributed by the application service system 130.

An example user device 120 comprises a user interface 121, an application 125, a data storage unit 127, and an application verification module 129. In an example embodiment, the user interface 121 enables the user 101 to interact with the application 125 on the user device 120. For example, the user interface 121 may be a touch screen, a web page, a voice-based interface or any other interface, which allows the user 101 to provide input and receive output from the application 125. In an example embodiment, the user interface 121 allows the user 101 to initiate the service request to be conveyed by the application 125 to the application service system 130. In another example embodiment, the user interface 121 displays an error message to the user 101 after the application service system 130 denies a service request and transmits an error message to the user device 120.

An example application 125 is a program, function, routine, applet or similar entity that exists on and performs its operations on the user device 120. For example, the application 125 may be one or more of a shopping application, merchant system 110 application, an Internet browser, a digital wallet application, a loyalty card application, another value-added application, a user interface 121 application, or other suitable application operating on the user device 120. In an example embodiment, the application 125 was created by the merchant service system 110 and distributed by the application service system 130. In some embodiments, the user 101 must install the application 125 and/or make a feature selection on the user device 120 to obtain the benefits of the techniques described herein. In an example embodiment, the user 101 may access the application 125 on the user device 120 via the user interface 121.

In an example embodiment, the application 125 can transmit a service request to the application service system 130. In an example embodiment, the service request is initiated by the user 101. In another example embodiment, the service request is a result of an input by the user 101 or the result of a user-initiated process. For example, the user 101 accesses the application 125 and desires to purchase a product using the user's 101 digital wallet. After the user 101 initiates the transaction, the application 125 transmits a service request to the application service system 130 to access the user's 101 digital wallet to process the transaction. In an example embodiment, as part of a service request to the application service system 130, the application 125 can transmit an access request to the application service system 130 in order to receive an access token comprising identifying information.

An example data storage unit 127 enables storage of application program code and any information extracted from the application program code. In an example embodiment, the data storage unit 127 can include any local or remote data storage structure accessible to the user device 120 suitable for storing information. In an example embodiment, the data storage unit 127 and application 125 may be implemented in a secure element or other secure memory (not shown) on the user device 120. In another example embodiment, the data storage unit 127 may be a separate memory unit resident on the user device 120. In an example embodiment, the data storage unit 127 can include any local or remote data storage structure accessible to the user device 120 suitable for storing information. In an example embodiment, the data storage unit 127 stores encrypted information, such as HTML5 local storage.

The application verification module 129 can be utilized by the application 125 and/or user device 120 to create access requests to the application service system 130. In an example embodiment, the application verification module 129 is part of the operating system of the user device 120. In another example embodiment, the user 101 downloads, saves, or otherwise enables the application verification module 129. In an example embodiment, the application verification module 129 communicates with the data storage unit 127 to access the application program code on the user device 120 in order to extract and transmit the identifying information to the application service system 130 as part of an access request. In another example embodiment, the application verification module 129 accesses the data storage unit 127 to obtain identifying information that has been previously extracted from the application program code and stored.

The components of the example-operating environment 100 are described hereinafter with reference to the example methods illustrated in FIGS. 2-5. The example methods of FIGS. 2-5 may also be performed with other systems and in other environments.

Example System Process

Figure 2:
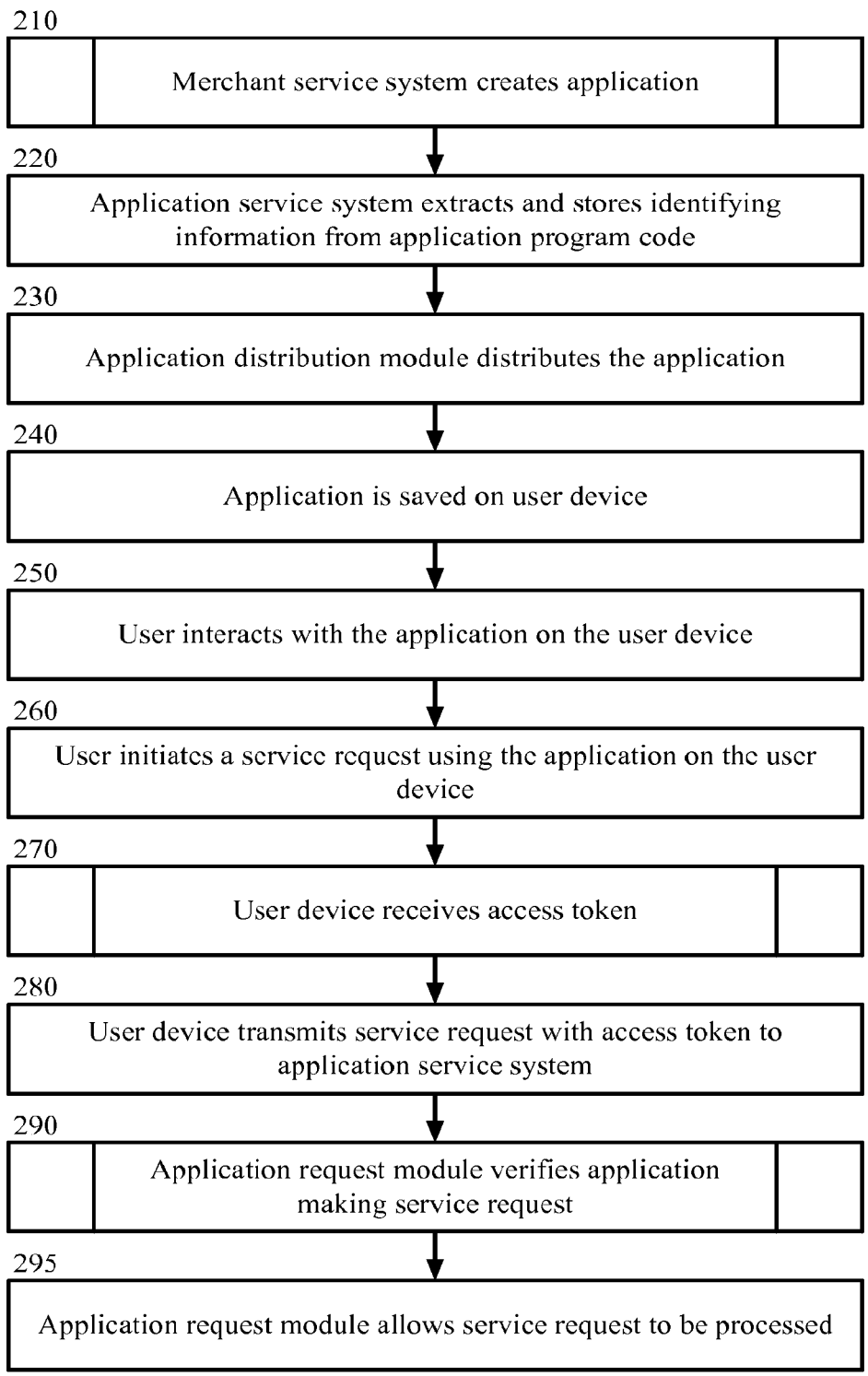
FIG. 2 is a block diagram depicting a method for verifying the identity of an application making a request to access services, in accordance with certain example embodiments.

FIG. 2 is a block flow diagram depicting a method 200 for verifying identities of service applications making requests, in accordance with certain example embodiments. The method 200 is described with reference to the components illustrated in FIG. 1.

In block 210, the merchant service system 110 creates the application 125. In an example embodiment, the application 125 comprises computer-readable instructions that can be executed on the user device 120 to perform one or more functions. In an example embodiment, the application 125 enables the user 101 to make a purchase, donate or transfer money, request or access information, make or change a reservation, redeem an offer, or process any other requests or transactions with the merchant service system 110. In another example embodiment, the application 125 enables the user 101 to make a request or conduct a transaction with an entity other than the merchant service system 110 via the user device 120. The method for creating the application 125 is described in more detail hereinafter with reference to the methods described in FIG. 3.

Figure 3:
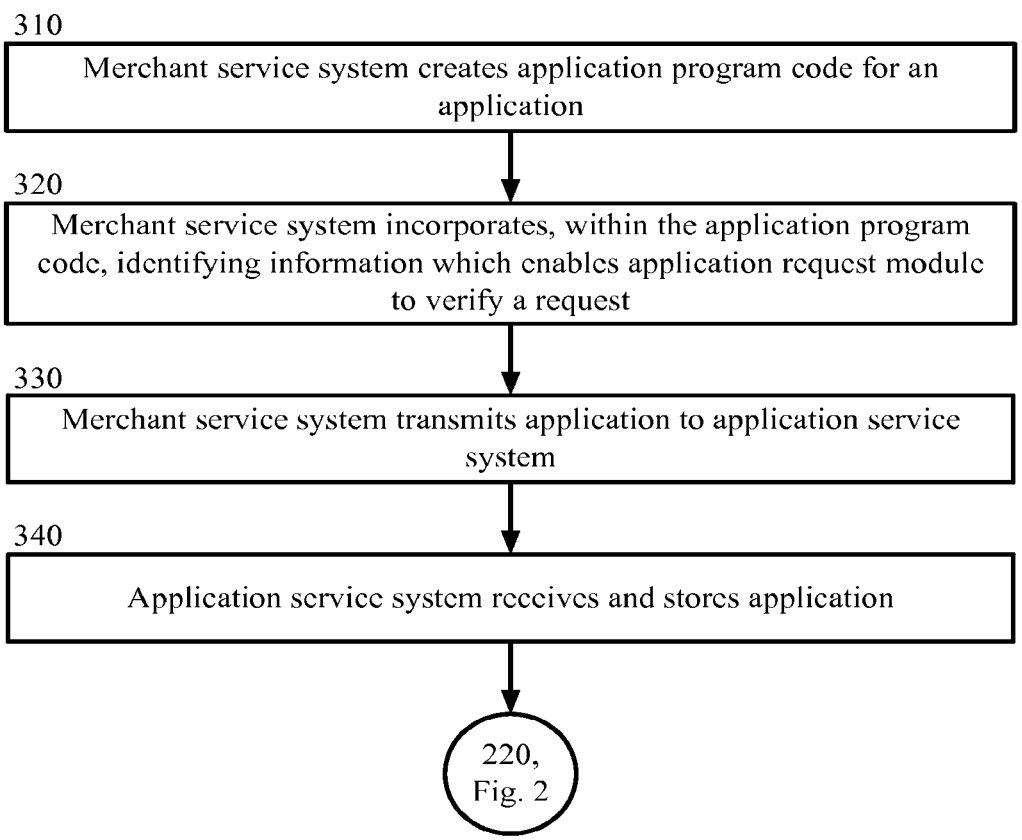
FIG. 3 is a block diagram depicting a method for developing an application comprising identifying information, in accordance with certain example embodiments.

FIG. 3 is a block flow diagram depicting a method 210 for creating the application 125, in accordance with certain example embodiments, as referenced in block 210. The method 210 is described with reference to the components illustrated in FIG. 1.

In block 310, the merchant service system 110 creates the application program code for the application 125. In an example embodiment, the merchant service system 110 creates the application program code with the merchant service system device 115 according to specifications and requirements set forth by the application service system 130. For example, the application service system 130 may require specific programming language in which the program code is to be written, a format for the elements of the program code, or other formatting or system requirements.

In block 320, the merchant service system 110 incorporates, within the application program code, identifying information that enables the application service system 130 to verify a request originated by the application 125 for processing a service. Example identifying information may comprise one or more of a digital signature, a package name, an application 125 identifier, a merchant service system 110 name, or other code or identifying information.

In another example embodiment, the identifying information is incorporated into the application program code after it is received by the application service system 130. In an example embodiment, the application service system 130 has specifications regarding the identifying information that must be met as a prerequisite to distributing the application 125. For example, the application service system 130 may require the merchant service system 110 to place the identifying information in a certain specified location in the application program code.

In block 330, the merchant service system 110 transmits the application 125 to the application service system 130. In an example embodiment, the merchant service system 110 transmits the application program code encoding the application 125.

In block 340, the application service system 130 receives and stores the application 125. In an example embodiment, the application 125 is received by the application distribution module 131. In an example embodiment, the application program code is stored in the data storage unit 137.

The method 210 then proceeds to block 220 in FIG. 2.

Returning to FIG. 2, in block 220, the application service system 130 extracts and stores the identifying information from the application program code. In an example embodiment, the application service system 130 extracts the identifying information from one or more specified locations in the application program code. In another example embodiment, the application service system 130 conducts a search algorithm to find and then extract the identifying information from the application program code. In another example embodiment, the application service system 130 makes a determination concerning what the identifying information is after viewing the application program code and then extracts that information for storage. In yet another example embodiment, the application service system 130 inserts identifying information into a certain location in the application program code and then stores the identifying information. In an example embodiment, the extracted identifying information is stored in the data storage unit 137.

In block 230, the application service system 130 distributes the application 125. In an example embodiment, the application service system 130 selects a distribution channel such as a website, an application store (for example, an "app" store), an online marketplace, or any location that allows the user 101 to select and download the application. In another example embodiment, the application 125 is transmitted by electronic mail, text messaging, or another suitable system configured to transmit the application 125 to the user device 120 or otherwise make the application 125 available for download on the user device 120. In another example embodiment, the application 125 is shareable from one user device 120 to another user device 120 and distribution takes place by proxy from one user 101 to another. In another example embodiment, the application 125 is distributed through a distribution channel and a user 101 downloads it to a user device 120 and transfers it to one or more additional devices 120 that belong to the same user 101.

In block 240, the application 125 is saved on the user device 120. For example, the user 101 accesses an online application store managed by the application service system 130 in order to browse applications to download onto the user device 120. In an example embodiment, the user 101 uses the user interface 121 in order to access the distribution channel where the application 125 is located. For example, the user 101 accesses an electronic mail message inbox using a web browser on the user device 120 and opens an electronic mail message containing the application 125 that was received from the application service system 130. In an example embodiment, the application 125 program code is saved on the data storage unit 127. In an example embodiment, once the application 125 is selected, an installation process is initiated and the application 125 becomes a resident on the user device 120. For example, the user 101 accesses a distribution channel with a personal computer and, after deciding that he wants to download the application 125 to the user device 120, selects the application 125 for download by double clicking it with a mouse.

In block 250, the user 101 interacts with the application 125 on the user device 120. For example, the user 101 desires to purchase a product from a merchant and opens the merchant's application 125 on the user device 120. Continuing with the previous example, the user 101 decides which product to buy from the merchant using the application 125. In an example embodiment, the user 101 interacts with the application 125 on the user device 120 using the user interface 121. For example, the user 101 may use a touch screen in order to interact with the application 125 on the user device 120 when deciding which product to purchase or information to request.

In block 260, the user 101 initiates a service request using the application 125 on the user device 120. In an example embodiment, the service request comprises the desired request that the user 101 initiates. For example, the user 101 desires to purchase a product using financial account information maintained in the user's 101 digital wallet maintained by the application service system 130. Upon initiating payment, a service request is created by the application 125 and sent to the application service system 130 to access the user's 101 digital wallet. In another example, a user 101 (such as a teacher) desires to access private information (such as homework answers) maintained by the application service system 130 (such as a textbook publisher). Upon requesting the information, a service request is created by the application 125 and sent to the application service system 130 to request access to the information.

In another example embodiment, the service request comprises part of the user 101 request. For example, the user 101 desires to purchase a product using a digital wallet maintained by the application service system 130 or a third party system (not shown) and have the product shipped to the user's 101 residence. The user 101 manually enters the shipping information into the application 125 and then initiates a single request that the item both be paid for using a digital wallet and that the item be shipped to the user's 101 address. The address information may be sent directly to the merchant by the application 125, but a service request is created by the application 125 to request access the user's 101 digital wallet to retrieve the user's 101 financial account information and process the payment. In another example embodiment, the user 101 does not enter the shipping information and service request comprises a request to retrieve the user's 101 financial account information and shipping information.

In block 270, the user device 120 receives an access token from the application service system 130. In an example embodiment, the user device 110 request the access token from the application service system 130. In this embodiment, the application service system 130 produces or retrieves the access token prior to transmitting it to the user device 110. In an example embodiment, the access token comprises identifying information used to verify the service request initiated by the user 101. In this embodiment, the access token is transmitted with the service request to the application service system 130 for verification. The method for receiving an access token is described in more detail hereinafter with reference to the methods described in FIG. 4.

Figure 4:
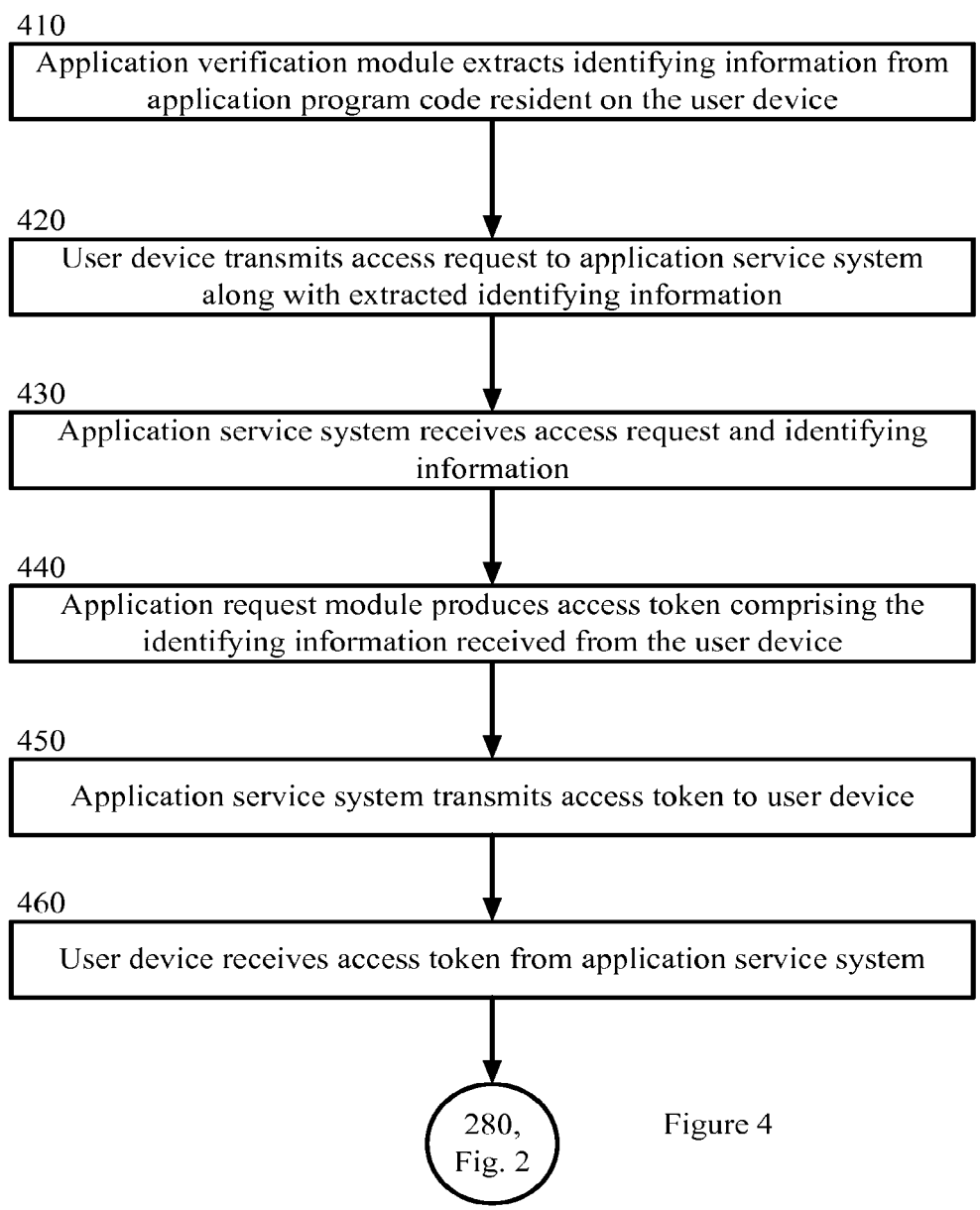
FIG. 4 is a block diagram depicting a method for receiving an access token, in accordance with certain example embodiments.

FIG. 4 is a block flow diagram depicting a method 270 for initiating an access request by an application 125 on a user device 120, in accordance with certain example embodiments, as referenced in block 250. The method 250 is described with reference to the components illustrated in FIG. 1.

In block 410, an application verification module 129 extracts identifying information from the application 125 program code resident on the user device 120. In an example embodiment, the user 101 service request triggers a preexisting access request algorithm in the application verification module 129 that initiates the extraction of the identifying information. In another example embodiment, the user 101 service request provides executable instructions that the application verification module 129 uses to find and extract the identifying information from the application 125 program code.

In block 420, the user device 120 transmits an access request to the application service system 130 along with extracted identifying information. In an example embodiment, the application verification module 129 extracts the identifying information and the produces the access request. In another example embodiment, the application verification module 129 transmits the identifying information to the application 125 and/or another module on the user device 110 for inclusion in the access request and transmission to the application service system 130.

In block 430, the application service system 130 receives the access request and the identifying information. In an example embodiment, the access request is received by the application request module 135. In an example embodiment, the application service system 130 relays a received access request to the application request module 135 to respond to the access request.

In block 440, the application request module 135 produces an access token comprising the identifying information received from the user device 120. For example, the application request module 135 receives an access request along with identifying information comprising package name X and digital signature Y. Continuing with the same example, the application request module 135 produces an access token comprising package name X and digital signature Y.

In block 450, the application service system 130 transmits the access token to the user device 120.

In block 460, the user device 120 receives the access token from the application service system 130. In an example embodiment, the access token is received by the application 125. In this embodiment, the access token is included in the service request made by the application 125. In another example embodiment, the access token is received by the application verification module 129 and transmitted or otherwise shared with the application 125 to permit it to be included in the service request. In an example embodiment, the user device 110, the application verification module 129, and/or the application 125 cannot read or otherwise understand the information contained in the access token. In this embodiment, the user device 110, the application verification module 129, and/or the application 125 are capable of determining that the access token is received in response to the access request and that it is a required element of the service request.

The method 270 then proceeds to block 280 in FIG. 2.

Returning to FIG. 2, in block 280, the user device 110 transmits the service request with the access token to the application service system 130. In an example embodiment, the service request comprises the unaltered access token. In an example embodiment, the user device 110 cannot read or otherwise understand the access token, however it is capable of determining that the access token is a required element of the service request.

In block 290, the application request module 135 verifies the application 125 making the service request. The method for verifying the application 125 is described in more detail hereinafter with reference to the methods described in FIG. 5.

Figure 5:
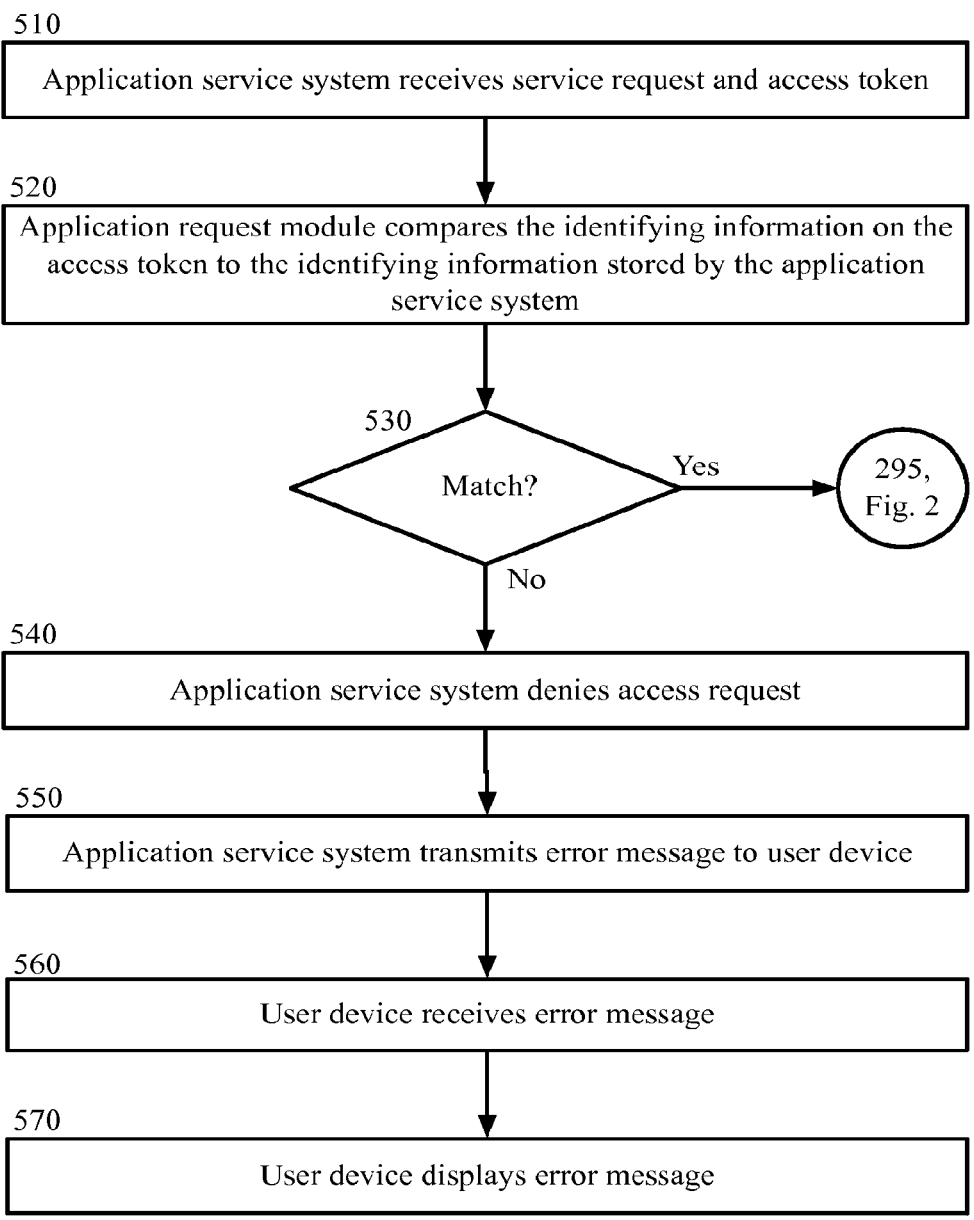
FIG. 5 is a block diagram depicting a method for comparing identifying information received in the access token to identifying information stored by the application service system, in accordance with certain example embodiments.

FIG. 5 is a block flow diagram depicting a method 290 for comparing identifying information received in an access token to identifying information extracted from application 125 program code received from a merchant services system 110, in accordance with certain example embodiments. The method 290 is described with reference to the components illustrated in FIG. 1.

In block 510, the application service system 130 receives the service request and access token.

In block 520, the application request module 135 compares the identifying information on the access token to the identifying information extracted and stored from the application 125 program code by the application service system 130. In an example embodiment, the application request module 135 comprises a verification request algorithm or computer program code that automatically initiates an application verification process upon receiving the service request from the application 125 without human intervention.

In block 530, the application request module 135 determines whether there is a match between the identifying information on the access token and the identifying information extracted and stored from the application 125 program code by the application service system 130.

If the identifying information does not match, the method 290 proceeds to block 540 in FIG. 5. For example, the identifying information extracted from the application program code received from the merchant service system 110 is Package Name X and Digital Signature A, but the identifying information received from the access token from user device 120 is Package Name X and Digital Signature B.

In block 540, the application service system 130 denies the access request received from the user device 120. For example, the service request is to process a payment using the user's 101 digital wallet maintained by the application service system 130. Having determined that the identifying information provided by the requesting application 125 is invalid, the digital wallet is not accessed and the payment is not effected. In an example embodiment, the application service system 130 denies the application's 125 request to use its servers to perform a process or to access information.

In block 550, the application service system 130 transmits an error message to the user device 120. In an example embodiment, the application request module 135 transmits the error message to the user device 120. In an example embodiment, the error message comprises language that is intended to communicate to the user 101 that that the service request was unable to be processed.

In block 560, the user device 120 receives the error message.

In block 570, the user device 120 displays the error message. In an example embodiment, the error message is displayed on the user interface 121 of the user device 120. In an example embodiment, the error message comprises of language that is propagated through sound or a visual medium. For example, the error message may consist of a readable message that says "error: the service request was unable to be processed" alone or together with a computerized voice that conveys the error message to the user 101.

Returning to block 530, if the application request module 135 determines there is a match between the identifying information received from the access token and the identifying information extracted from the application program code received from the merchant service system 110, the method 290 then proceeds to block 295 in FIG. 2. For example, the identifying information extracted from the application program code received from the merchant service system 110 is Package Name X and Digital Signature A, and the identifying information received from the access token is Package Name X and Digital Signature A.

Returning to FIG. 2, block 295, the application service system 130 allows the service request to be processed. In an example embodiment, the processing of the service request comprises one or more of processing a financial transaction, accessing shipping information, accessing information from an account maintained by the application service system 130, or applying coupons or offers to a transaction.

Other Example Embodiments

Figure 6:
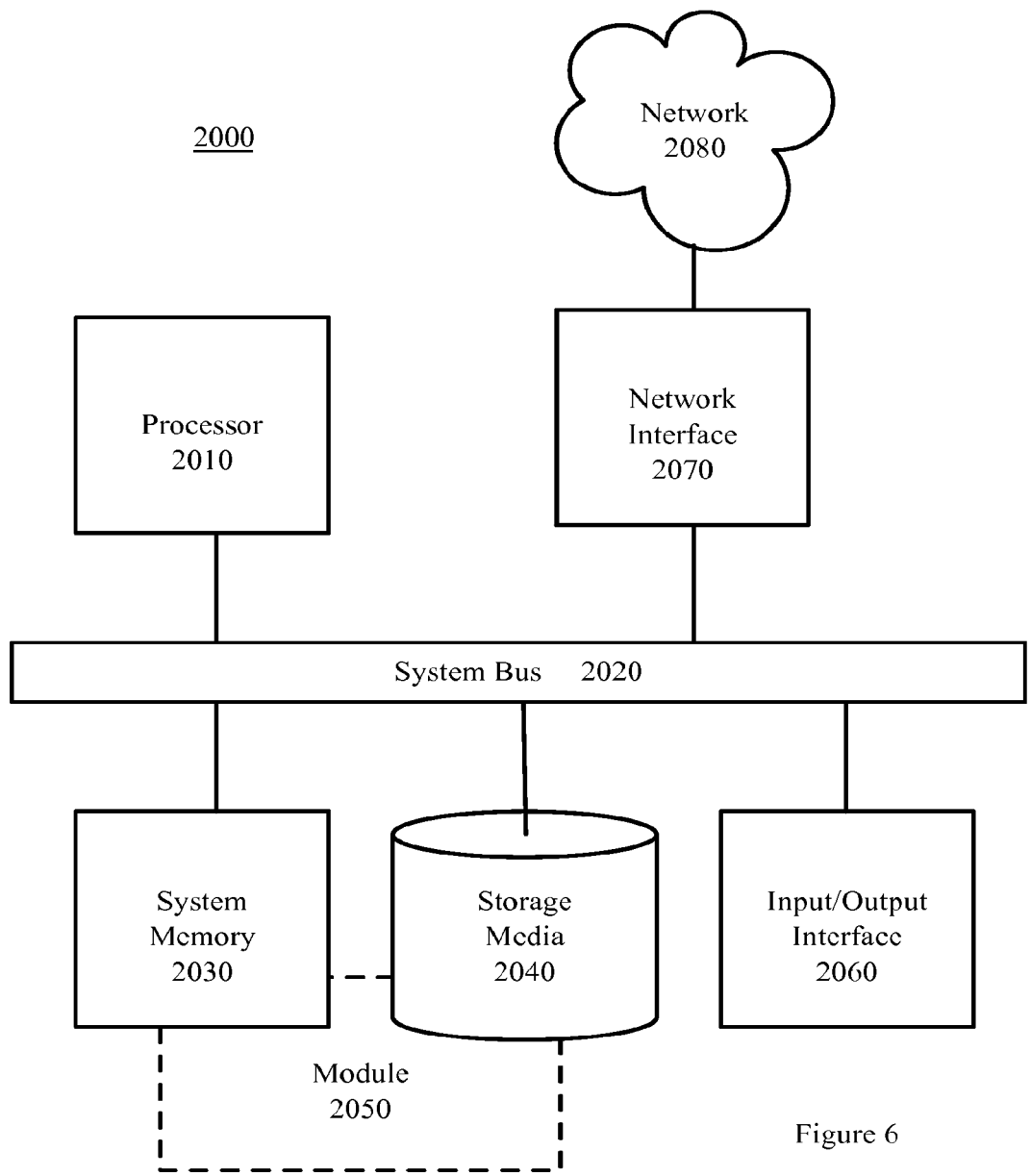
FIG. 6 is a block diagram depicting a computer machine and module, in accordance with certain example embodiments.

FIG. 6 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory (ROM), programmable read-only memory (PROM), erasable programmable read-only memory (EPROM), flash memory, or any other device capable of storing program instructions or data with or without applied power. The system memory 2030 may also include volatile memories such as random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of all of or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip (SOC), system on package (SOP), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to verify identities of services making service requests, comprising:
receiving, by one or more computing devices and from a computing device operated by a user, an access request, wherein the access request comprises a request for an access token and identifying information, and wherein the computing device operated by the user extracts the identifying information from a service program code associated with a merchant service system, the service program code being resident on the computing device operated by the user, wherein the service program code comprises computer-readable instructions executable by the computing device operated by the user to perform a service, and wherein the identifying information enables the one or more computing devices to verify a service request made by the computing device operated by the user;

producing, by the one or more computing devices, an access token, wherein the access token comprises the identifying information received from the computing device operated by the user;

transmitting, by the one or more computing devices, the access token to the computing device operated by the user;

receiving, by the one or more computing devices and from the computing device operated by the user, the access token and a service request, wherein the service request comprises a request by the service to perform an action via the one or more computing devices; and determining, by the one or more computing devices, whether to allow or deny the service request by comparing the identifying information from the access token received from the computing device operated by the user to identifying information associated with the service program code associated with the merchant service system.

2. The method of claim 1, further comprising:

in response to comparing the identifying information from the access token received from the computing device operated by the user to the extracted identifying information from the service program code received from the merchant service system, detecting, by the one or more computing devices, a match between the identifying information from the access token and the extracted identifying information; and allowing, by the one or more computing devices, the service request to be processed in response to detecting the match.

3. The method of claim 1, further comprising:

in response to comparing the received identifying information from the access token received from the computing device operated by the user to the extracted identifying information from the service program code received from the merchant service system, detecting, by the one or more computing devices, a discrepancy between the identifying information from the access token and the extracted identifying information;

denying, by the one or more computing devices, the service request in response to detecting the discrepancy between the identifying information from the access token and the extracted identifying information; and transmitting, by the one or more computing devices, an error message to the computing device operated by the user, wherein the error message is displayed by the computing device operated by the user.

4. The method of claim 1, wherein the identifying information is required for distribution of the service program code by the one or more computing devices.

5. The method of claim 1, wherein the identifying information comprises one or more of an application identifier, a package name, and a digital signature.

6. The method of claim 1, wherein the service comprises a merchant service application, a merchant service website, or a merchant shipping service.

7. The method of claim 1, wherein the service request comprises a request for the processing of a financial transaction by the service, a request for shipping information, a request for information from an account of the user maintained by the one or more computing devices, or a request for offers or coupons to be redeemed.

8. The method of claim 1, wherein extracting the identifying information from the service program code received from the merchant service system comprises executing, by the one or more computing devices, a search algorithm that locates and extracts the identifying information from the service program code.

9. The method of claim 1, wherein extracting the identifying information from the service program code received from the merchant service system comprises identifying, by the one or more computing devices, a predetermined location in the service program code and extracting the identifying information form the predetermined location.

10. The method of claim 1, wherein an access request algorithm on the computing device operated by the user is activated in response to a service request being initiated on the computing device operated by the user, wherein the access request algorithm identifies and extracts the identifying information from the service program code on the computing device operated by the user and transmits the identifying information along with an access request to the one or more computing devices.

11. A computer program product, comprising:

a non-transitory computer-readable medium having computer-executable program instructions embodied thereon that when executed by a computer cause the computer to verify identities of services making service requests, the computer-executable program instructions comprising:

computer-executable program instructions to receive service program code from a merchant service system, wherein the service program code comprises identifying information that enables one or more computing devices to verify a service request made by a computing device operated by a user;

computer-executable program instructions to extract the identifying information from the service program code received from the merchant service system;

computer-executable program instructions to receive an access request from a computing device operated by a user, wherein the access request comprises a request for an access token and identifying information, and wherein the computing device operated by the user extracts the identifying information from service program code resident on the computing device operated by the user;

computer-executable program instructions to transmit an access token to the computing device operated by the user, wherein the access token comprises the identifying information received form the computing device operated by the user;

computer-executable program instructions to receive from the computing device operated by the user, a service request, wherein the service request comprises a request by the service to perform an action via the one or more computing devices and the access token; and computer-executable program instructions to determine whether to allow or deny the service request by comparing the identifying information from the access token received from the computing device operated by the user to the identifying information from the service program code received from the merchant service system.

12. The computer program product of claim 11, further comprising computer-executable program instructions to extract the identifying information from the service program code received from the merchant service system.

13. The computer program product of claim 12, wherein extracting the identifying information from the service program code received from the merchant service system comprises computer-executable program instructions to execute a search algorithm that locates and extracts the identifying information from the service program code.

14. The computer program product of claim 11, further comprising:
in response to comparing the identifying information from the access token to the identifying information from the service program code, computer-executable program instructions to detect a match between the identifying information received form the computing device operated by the user and the identifying information received from the merchant service system; and
in response to detecting the match, computer-executable program instructions to allow the service request to be processed.

15. A system for verifying identities of services making service requests, comprising:
a non-transitory storage medium; and
a processor communicatively coupled to the storage medium, wherein the processor executes application code instructions that are stored in the storage medium to cause the system to:
receive, from a merchant system, service program code, wherein the service program code comprises identifying information that enables the system to verify a service request made by a computing device operated by a user;
extract the identifying information from the service program code received from the merchant service system;
distribute the service program code for operation on the computing device operated by the user, wherein the service program code comprises computer-readable instructions executable by the computing device operated by the user to perform a service;
receive an access request from the computing device operated by the user, wherein the access request comprises a request for an access token and identifying information, and wherein the computing device operated by the user extracts the identifying information from the service program code resident on the computing device operated by the user;
transmit the access token to the computing device operated by the user, wherein the access token comprises the identifying information received from the computing device operated by the user;
receive a service request from the computing device operated by the user, wherein the service request comprises a request by the service to perform an action via the one or more computing devices and the access token; and
determine whether to allow or deny the merchant service request by comparing the identifying information received from the service program code on the computing device operated by the user to identifying information in service program code received from the merchant system.

16. The system of claim 15, wherein extracting the identifying information from the service program code received from the merchant service system comprises processing computer-executable instructions for executing a search algorithm that locates and extracts the identifying information from the service program code.

17. The system of claim 15, wherein extracting the identifying information from the service program code received from the merchant service system comprises processing computer-executable instructions for identifying a predetermined location in the service program code and extracting the identifying information from the predetermined location.

18. The system of claim 15, wherein the processor is further configured to execute computer-executable instructions stored in the storage medium to cause the system to:
in response to comparing the received identifying information from the access token received from the computing device operated by the user to the identifying information from the service program code received from the merchant service system, detect a match between the identifying information received from the computing device operated by the user and the extracted identifying information; and
allow the service request to be processed in response to detecting the match.

19. The system of claim 15, wherein the processor is further configured to execute computer-executable instructions stored in the storage medium to cause the system to:
in response to comparing the received identifying information from the access token received from the computing device operated by the user to the identifying information from the service program code received from the merchant service system, detect a discrepancy between the identifying information received from the computing device operated by the user and the extracted identifying information;
deny the service request in response to detecting the discrepancy; and
transmit an error message to the computing device operated by the user, wherein the error message is displayed by the computing device operated by the user.

* * * * *